United States Patent [19]

Bivens

[11] Patent Number: 5,486,370
[45] Date of Patent: Jan. 23, 1996

[54] METHOD OF CONTINUOUSLY FILTERING COOKING OIL

[76] Inventor: Thomas H. Bivens, P.O. Box 1250, Magnolia, Tex. 77355

[21] Appl. No.: 356,146

[22] Filed: Dec. 15, 1994

Related U.S. Application Data

[62] Division of Ser. No. 187,115, Jan. 26, 1994, Pat. No. 5,404,799, which is a continuation of Ser. No. 947,479, Sep. 21, 1992, abandoned.

[51] Int. Cl.$^6$ ..................................................... C11B 5/00
[52] U.S. Cl. .................... 426/417; 426/438; 99/408; 99/403; 126/391; 134/111; 134/169 R; 710/167; 710/DIG. 8
[58] Field of Search ................................. 426/417, 438; 99/330, 403, 407, 408, 409, 410; 210/167, 461, 486, 489, DIG. 8; 126/351, 374, 391; 236/26 A; 134/111, 166 R, 169 R

[56] References Cited

U.S. PATENT DOCUMENTS

| | | | |
|---|---|---|---|
| 2,053,568 | 9/1936 | Levin | 99/408 |
| 2,287,396 | 6/1942 | Roth | 99/403 |
| 2,610,740 | 9/1952 | Hunter | 99/408 X |
| 3,107,601 | 10/1963 | Longmire | 99/408 |
| 3,210,193 | 10/1965 | Martin | 426/438 X |
| 3,263,818 | 8/1966 | Gedrich | 210/167 X |
| 3,279,605 | 10/1966 | Shepherd | 210/167 X |
| 3,477,361 | 11/1969 | Bradshaw | 99/408 X |
| 3,483,982 | 12/1969 | Nelson | 99/408 |
| 3,495,525 | 2/1970 | Piotrowski | 99/408 |
| 3,667,374 | 6/1972 | Holmes | 99/408 |
| 3,735,871 | 5/1973 | Bisko | 210/167 |
| 4,499,196 | 2/1985 | Yuki | 426/417 X |
| 4,599,990 | 7/1986 | Fritzsche et al. | 99/403 X |
| 4,681,768 | 7/1987 | Mulflur et al. | 426/417 |
| 4,735,815 | 4/1988 | Taylor et al. | 426/417 |
| 4,764,384 | 8/1988 | Gyann | 426/417 |
| 4,805,525 | 2/1989 | Bivens | 99/408 |
| 4,880,652 | 11/1989 | Degutti | 426/417 |
| 4,913,922 | 4/1990 | Hawkes et al. | 426/417 |
| 4,945,893 | 8/1990 | Manchester | 99/403 X |
| 5,045,200 | 9/1991 | Brook | 426/417 X |
| 5,101,714 | 4/1992 | Grendi | 99/408 X |

Primary Examiner—Donald E. Czaja
Assistant Examiner—Milton I. Cano
Attorney, Agent, or Firm—Keeling Law Firm

[57] ABSTRACT

A continuous-filtering fryer apparatus for and process of continuously filtering of cooking oil while cooking having a tank with a bottom and side walls extending from the bottom, an inlet port extending into the interior of the tank, an outlet port affixed to the tank and in communication with an interior of the tank adjacent a bottom of the tank, a pump connected to the inlet port and to the outlet port so as to draw cooking oil from the tank and to pass the cooking oil to the inlet port, heating elements extending into the interior of the interior of the tank, and a filter plate attached to the inlet port adjacent to the bottom of the tank for removing particles from the cooking oil. The inlet port is positioned so as to be below the level of cooking oil in the tank. The filter plate has a first mesh screen, a second mesh screen, and a layer of porous material sandwiched between the mesh screens. A lower cap is threadedly connected to the outlet port and an upper cap is threadedly connected to the lower cap with the mesh screens and porous material layer interposed between the lower cap and the upper cap. A method for continuously filtering cooking oil while frying comprising circulation of cooking oil through a mesh screen and related piping returning the cooking oil to the tank until an aggregation of particulate matter accumulates on the outside surface of the mesh screen and thereafter continually circulating the cooking oil during frying operation.

5 Claims, 3 Drawing Sheets

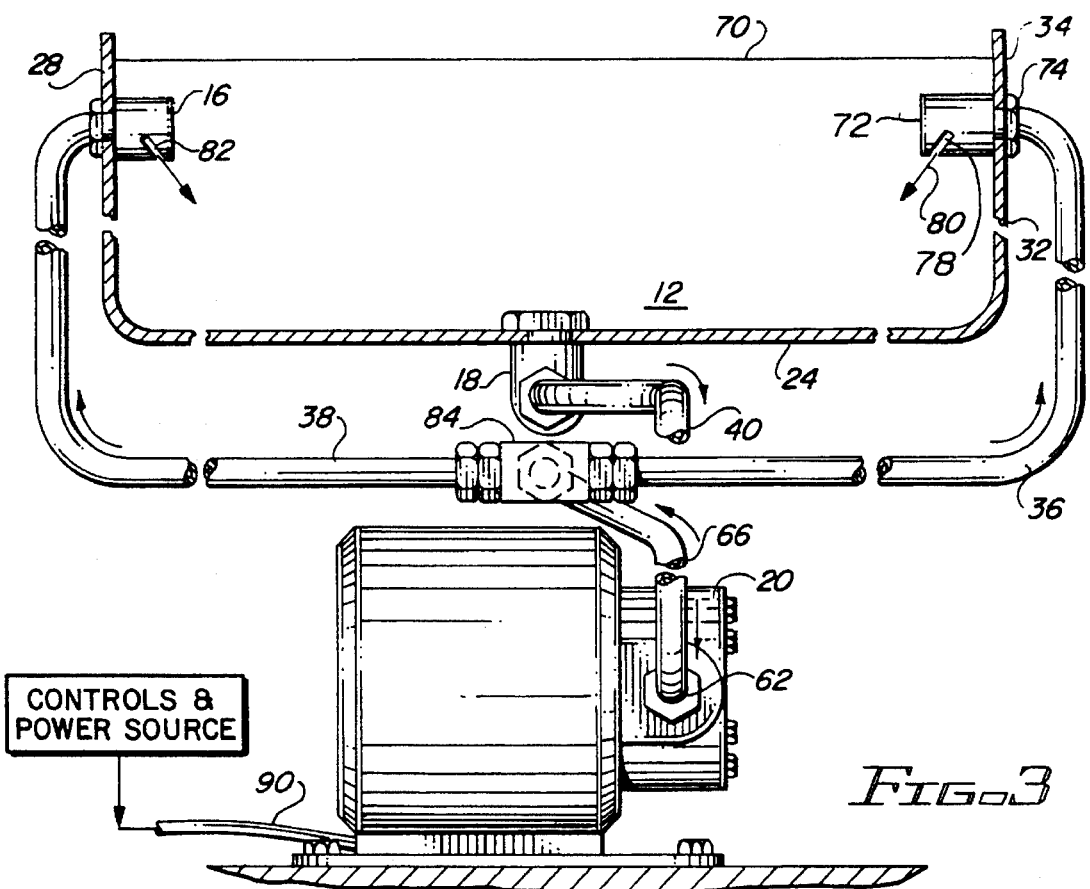
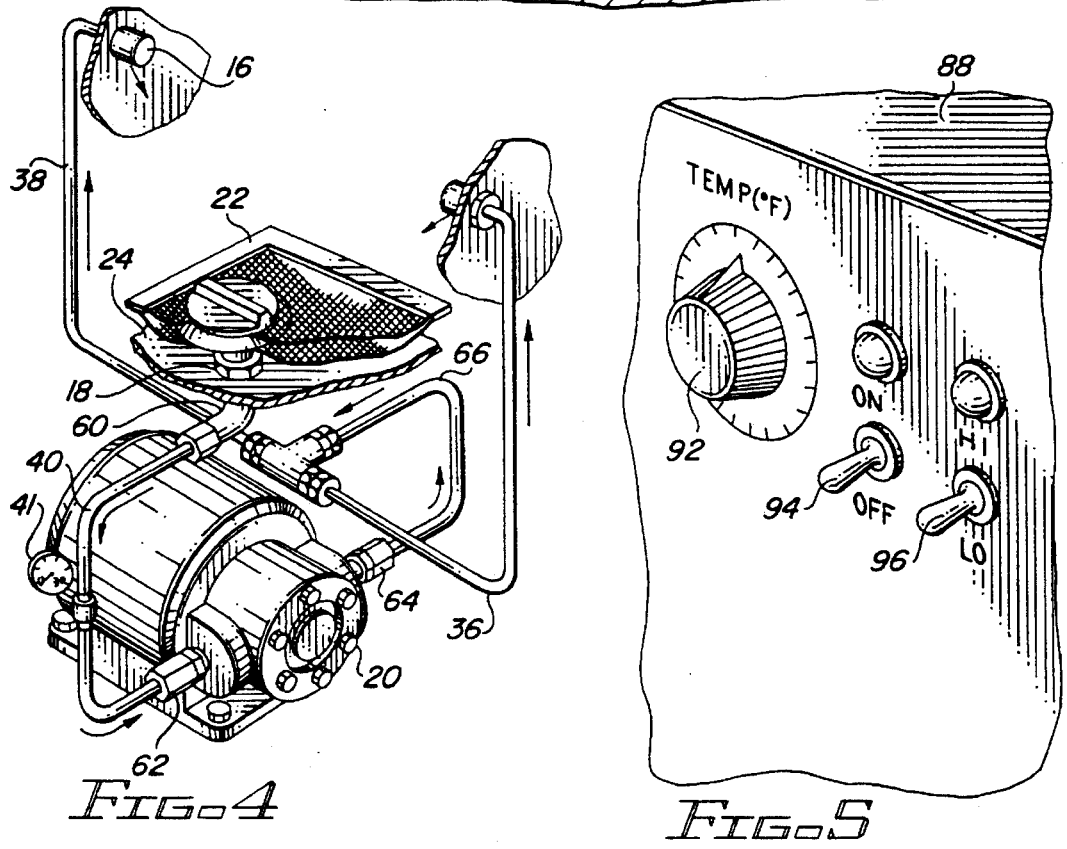

METHOD OF CONTINUOUSLY FILTERING COOKING OIL

This is a divisional of application Ser. No. 08/187,115 filed on Jan. 26, 1994, now U.S. Pat. No. 5,404,799 which is a continuation of application Ser. No. 07/947,479 filed on Sep. 21, 1992, now abandoned.

TECHNICAL FIELD

The present invention relates generally to frying apparatus used for deep-fat frying. More particularly, the present invention relates to a fryer which provides continuous filtration during the frying operation.

BACKGROUND ART

Cooking oil is extensively used in the food industry to cook various comestibles. Animal fat or other suitable material may sometimes be used as the cooking material in lieu of cooking oil. The term "cooking oil" is used herein to designate any such material.

Frying is frequently accomplished in relatively deep containers with the comestible to be cooked immersed in the cooking oil. In cases where quantities of food are regularly cooked in such a manner, the cooking oil becomes contaminated with various particles of food or other impurities, and charred food particles produce an odor which adversely affects the taste of foods cooked therein.

Existing commercially-available systems and apparatus for filtering cooking oil require that the cooking operation be interrupted to filter the cooking oil. Wire mesh strainers have long been known and used to remove relatively large particulate matter from cooking oil. Strainers have not been effective, however, to remove sufficient particulate matter to provide particulate-free cooking oil, and have been demonstrated to only slightly prolong the usefulness of the cooking oil. In order to effectively remove and control free fatty acids in the cooking oil, suspended particles of the size of two (2) microns and larger should be removed from the cooking oil.

As presently commercially practiced, cooking oil is cleaned by pumping it through a filter assembly often containing filter paper or other disposable filter element. A filter powder is normally applied to the filter element by dispersal in the cooking oil. This filter powder serves to precipitate particulates and to control odors. Filter powders commonly consist of diatomaceous earth or pearlite. Various other filter powders are used which are made up of various chemical mixtures.

The principal disadvantage of presently practiced methods of filtering cooking oil is that such methods require that the cooking operation be ceased during the period that the cooking oil is filtered. This results in significant down-time.

Filtering apparatus utilizing paper filtering medium require additional down-time due to the necessity of replacing filter elements.

U.S. Pat. No. 4,805,525, issued on Feb. 21, 1989, to the present inventor, describes a cooking oil filtering apparatus which can be used to effectively remove particulates from the cooking oil. This filtering apparatus is inserted within a tank of cooking oil and is generally suspended from the top of the tank. The cooking oil is drawn through wire mesh screens by applying a suction into the wire mesh screens. As the cooking oil is drawn to the wire mesh screens, the screen serves to remove particulates from the cooking oil. The particulate-free cooking oil is then drawn into an outlet and drawn upwardly through the tank to a pumping apparatus. The pumping apparatus will then pass the cooking oil outwardly so that it flows back into the tank and is delivered onto the top surface of the remaining cooking oil in the tank. This process is carried on until particulate matter is removed from the cooking oil. A filter powder is dispersed in the cooking oil to accumulate on the outer surfaces of the wire mesh screens. A Re-issue Application, application Ser. No. 07/813,870 has been filed in relation to the subject patent. The subject apparatus eliminated the need for filter paper. However, it remains necessary with the subject apparatus to discontinue the cooking process while the filtration is accomplished.

Various other U.S. Patents have described cooking oil filtering apparatus. U.S. Pat. No. 4,604,203, issued to Kyle, discloses a cooking oil filtering apparatus and filter therefor using a layered filter formed of a porous web of microfibers and supported by a material more porous than the microfiber web. The filter material which is used is replaced from time to time. U.S. Pat. No. 3,735,871, issued to Bisko, shows a cloth filter jacket for a cooking oil filtering apparatus. The purpose of this apparatus is to provide a jacket which enables cleaning of the filter assembly by scraping. This serves to prolong the time between disassembly of the filter apparatus and replacement of the disposable filter element. U.S. Pat. No. 3,279,605, issued to Shepherd, discloses a filter assembly in which the cooking oil is pumped through the filter assembly. The filter assembly includes a disposable filter medium. U.S. Pat. No. 3,263,818, issued to Gedrich, shows a cooking oil filtering apparatus providing pumping of the filtered cooking oil to its original, or other, container. The filter assembly which is disclosed includes a disposable filter element. U.S. Pat. No. 2,760,641, issued to Miles et al., discloses a portable filtering apparatus providing pumping of the cooking oil through the filter assembly. The filter assembly includes a disposable filter element. U.S. Pat. No. 2,635,527, issued to Overbeck, discloses a deep frying strainer to be located at the bottom of the cooking oil container to strain food particles from cooking oil as the strainer is lifted from the container. The liquid is forced through the strainer by the action of gravity. Although this device is beneficial for the removal of much of the particulate matter, this device does not effectively remove smaller particulate contaminants. Klopfenstein U.S. Pat. No. 2,359,368, discloses a filter element disposed in a tank containing an unfiltered liquid, for supporting a coating of filtering material such as diatomaceous earth.

Other United States patents depicting filtering and/or straining apparatus include Knight U.S. Pat. No. 445,223, Webb U.S. Pat. No. 2,424,211, Hunter U.S. Pat. No. 2,610,740, Avery U.S. Pat. No. 3,147,220, Wagner U.S. Pat. No. 3,159,094, Holman Pat. No. 3,667,374, Kuether et al. U.S. Pat. No. 4,113,623, Whaley et al. U.S. Pat. No. 4,328,097, and Prudhomme U.S. Pat. No. 4,591,434.

Other publications describing cooking oil filtering systems include:

"New! Permafil Oil Filters;" Filtration International, Inc., Houston, Tex.; date unknown.

"Permafil" Brochure; Edible Oil Division, Houston, Tex.; date unknown.

The Filter Magic® Sytem by Frymaster Wellbilt Co. Bulletin No. 818-001 Rev 11/86, date unknown.

Re Nu Brochure, Re Nu Vacuum Filter Manufacturing Company, date unknown.

R. F. Hunter Co., Inc. Brochure, date unknown.

Robot Coupe USA Inc. Brochure, date unknown.

Castle Filter Brochure, The Prince Castle Co., date unknown.

Fastfilter® Assembly and Operating Instructions, date unknown.

Custom Built-In Micro-Flo Oil Filtration, Dean/Alco 11/84.

The patent references and commercial publications do not teach nor disclose a continuous-filtering fryer of the present invention.

It is an object of the present invention to provide a frying apparatus that effectively filters cooking oil during cooking operation.

It is another object of the present invention to provide a frying apparatus that effectively removes particulate matter from cooking oil without the necessity of regular replacement of the filter element.

It is another object of the present invention to provide a frying apparatus incorporating a permanent filter element to provide for relatively efficient and economical filtering of cooking oil.

It is another object of the present invention to provide a frying apparatus requiring relatively infrequent shut-downs for cleaning operations.

It is another object of the present invention to provide a frying apparatus utilizing suction to draw cooking oil through the filtering medium.

It is another object of the present invention to provide a frying apparatus which prevents aeration and splattering of the cooking oil.

It is another object of the present invention to provide a frying apparatus having the filtering element located in the relatively cool area of the cooking oil located below the heating elements.

It is another object of the present invention to provide a frying apparatus in which the filtering element is supported from the bottom of the tank so as to provide for unimpeded access to the top surface of the cooking oil.

These and other objects and advantages of the present invention will become apparent from a reading of the attached specification and appended claims.

SUMMARY OF THE INVENTION

The present invention is a continuous-filtering fryer that comprises a tank having a bottom and side walls extending from the bottom, an inlet port extending into an interior of the tank, an outlet port affixed to the tank and in communication with an interior of the tank adjacent a bottom of the tank, a pump connected to the inlet port and to the outlet port so as to draw cooking oil from the tank and to pass the cooking oil to the inlet port, heating elements extending into the interior of the tank, and a filter plate attached to the outlet port adjacent to the bottom of the tank. The filter plate serves to accumulate free particles from the cooking oil during the cooking operation.

The inlet port is affixed to at least one side wall of the tank below a top edge of the tank. The inlet port has a slotted bottom surface so as to direct cooking oil toward the bottom of the tank. Specifically, the inlet port includes a first inlet port which is positioned on one side wall of the tank and a second inlet port which is positioned on another side wall of the tank. The first and second inlet ports are connected to the pump by a conduit. This conduit includes a first line extending from the first inlet port, and a second line extending from the second inlet port. The first and second lines are connected to a T-branch. The T-branch is, in turn, connected to the pump. The T-branch serves to pass cooking oil relatively evenly between the first inlet port and the second inlet port. The inlet ports are positioned below the level of the cooking oil within the tank.

The pump applies a suction to the outlet port, thereby drawing cooking oil through the filter plate. The pump passes the cooking oil continuously to the inlet port, and, thereby into the interior of the tank. The pump is electrically connected to a remote controller. This remote controller controls the temperature and flow rate of the cooking oil. Heating elements are provided within the tank. The outlet port comprises a threaded member which is affixed to the bottom surface of the tank and extends therethrough. The threaded member has an interior passageway which extends so as to open to the interior of the tank. The threaded member extends vertically upwardly from this bottom surface of the tank. A line is connected to the threaded member and extends to the pump exterior of the tank.

The filter plate is removably attached to the outlet port. The filter plate extends in generally parallel relationship to the bottom surface of the tank. The filter plate comprises a first mesh screen, a second mesh screen, and a tubular slit material layer sandwiched between the mesh screens. The outlet port is in fluid communication with the tubular slit material layer so as to draw the cooking oil through the mesh screens. The filter plate also includes a lower cap member which is threadedly removably connected to the outlet port. The lower cap serves to support the second mesh screen in a transverse position relative to the outlet port and in a parallel position with respect to the bottom of the tank. The lower cap member has an annular interior extending therethrough in fluid communication with the outlet port. The filter plate also includes an upper cap member which is threadedly received by the lower cap member. The upper cap has a head and a body portion. The body portion has a plurality of ports extending radially therethrough. The body portion also has an interior passageway in fluid communication with these radial ports. The mesh screens and the tubular slit material layer are interposed between the upper cap and the lower cap. The spacing between the strands within the mesh screens is between two and five microns. Within the concept of the present invention, a filter powder may be distributed in the cooking oil to provide surface-to-surface contact across outer surfaces of the mesh screens.

BRIEF DESCRIPTION OF THE DRAWINGS

FIG. 3 is a partial cross-sectional view taken across lines 3—3 of FIG. 1 of the cooking oil filtering apparatus of the present invention.

FIG. 4 is an isometric view showing the configuration of the pump and the cooking oil flow lines of the present invention.

FIG. 5 is an isometric view of the remote controller of the present invention.

DETAILED DESCRIPTION OF THE INVENTION

Figure 1:
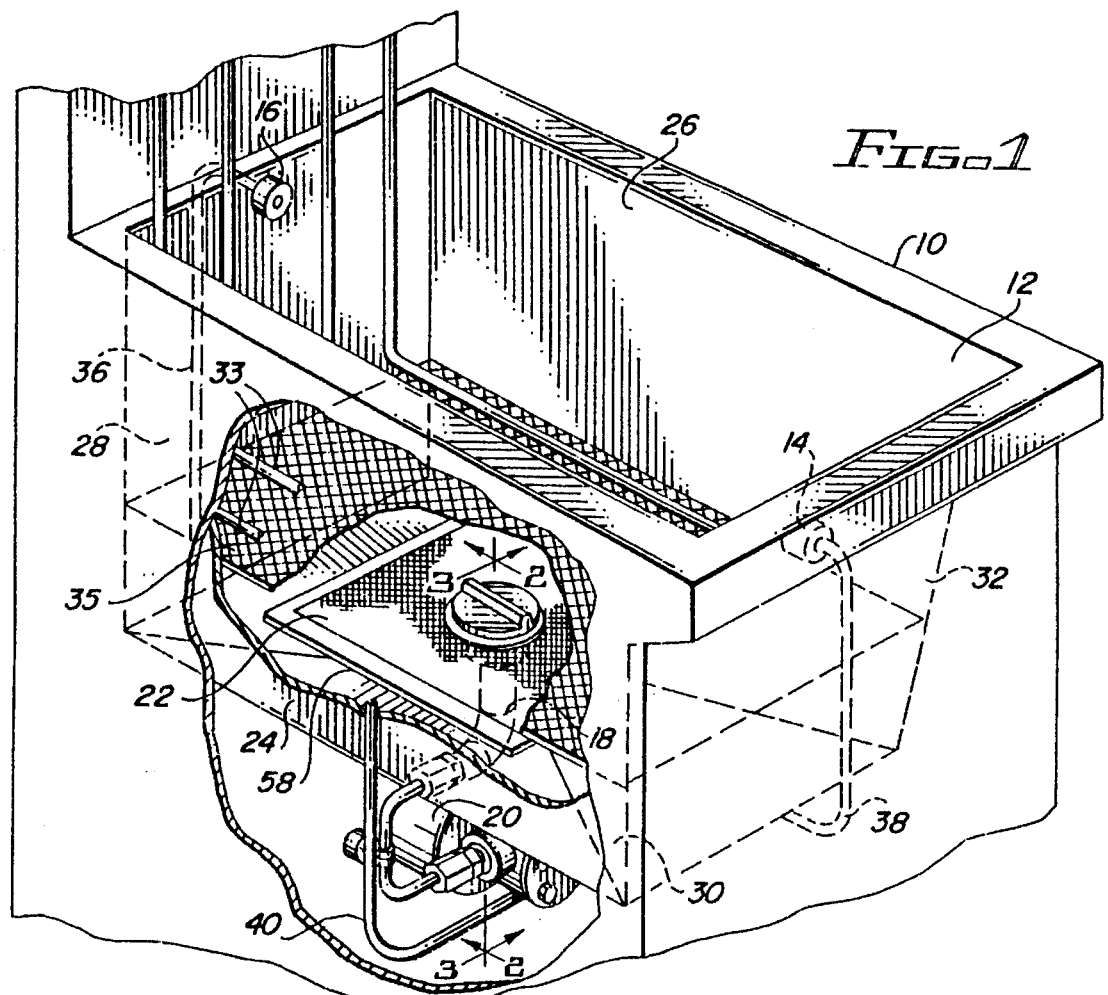
FIG. 1 is a partially cutaway isometric view of the cooking oil filtering apparatus in accordance with the preferred embodiment of the present invention.

Referring to FIG. 1, there is shown at 10 the continuous-filtering fryer apparatus in accordance with the preferred embodiment of the present invention. The continuous-filtering fryer apparatus 10 comprises a tank 12, inlet ports 14 and 16, and outlet port 18, a pump 20, and a filter plate 22. Each of these elements are arranged so as to provide the necessary filtering of the cooking oil contained within the fryer apparatus 10.

The tank 12 is suitable for receiving cooking oil therein. Tank 12 includes a bottom 24 and side walls 26, 28, 30, and 32. The side walls 26, 28, 30, and 32 extend upwardly from the bottom 24. The walls are arranged so as to define tank 12 for the containing of cooking oil therein. Suitable heating elements 33 are provided above screen 35 within the tank 12 so as to bring the cooking oil to a proper temperature. The heating elements 33 and the screen 35 are positioned above filter plate 22 in tank 12. In contrast to the heating element segments shown in FIG. 1, the heating elements 33 would extend across the interior of tank 12.

Inlet ports 14 and 16 are affixed to side walls 32 and 28, respectively. Inlet port 14 is positioned below the top surface 34 of side wall 32. Typically, the inlet port 14 will be positioned below the level of the cooking oil within tank 12. The inlet port 14 is affixed to side wall 32 so as to communicate with the interior of tank 12. A line 36 is connected to port 14 so as to allow cooking oil to be passed through the port 14 into the interior of tank 12. Similarly, the inlet port 16 is positioned on and affixed to the side wall 28. Another line 38 is connected to port 16 for the purpose of delivering cooking oil through port 16 into the interior of tank 12. It can be seen that inlet port 14 is positioned on the opposite side of tank 12 from that of inlet port 16. The positioning of inlet ports 14 and 16, in this manner, allows for an even distribution of the delivered cooking oil in the interior of tank 12. This allows the filtered cooking oil to be distributed more evenly and properly throughout the interior of tank 12. If necessary, additional inlet ports can be added through the side walls of tank 12.

The outlet port 18 is affixed to the tank 12 so as to be in communication with an interior of the tank generally adjacent to the bottom 24 of tank 12. The outlet port 18, to be described hereinafter, is connected by line 40 to pump 20. In general, the outlet port 18 is designed so as to produce a suction which draws the cooking oil thereunto. The cooking oil is drawn through line 40 into pump 20. The pump 20 is positioned below the bottom 24 of tank 12. After the cooking oil has entered the pump 20, the pump 20 serves to pass the cooking oil outwardly through line 66 to the lines 36 and 38 to inlet ports 14 and 16, respectively.

Figure 2:
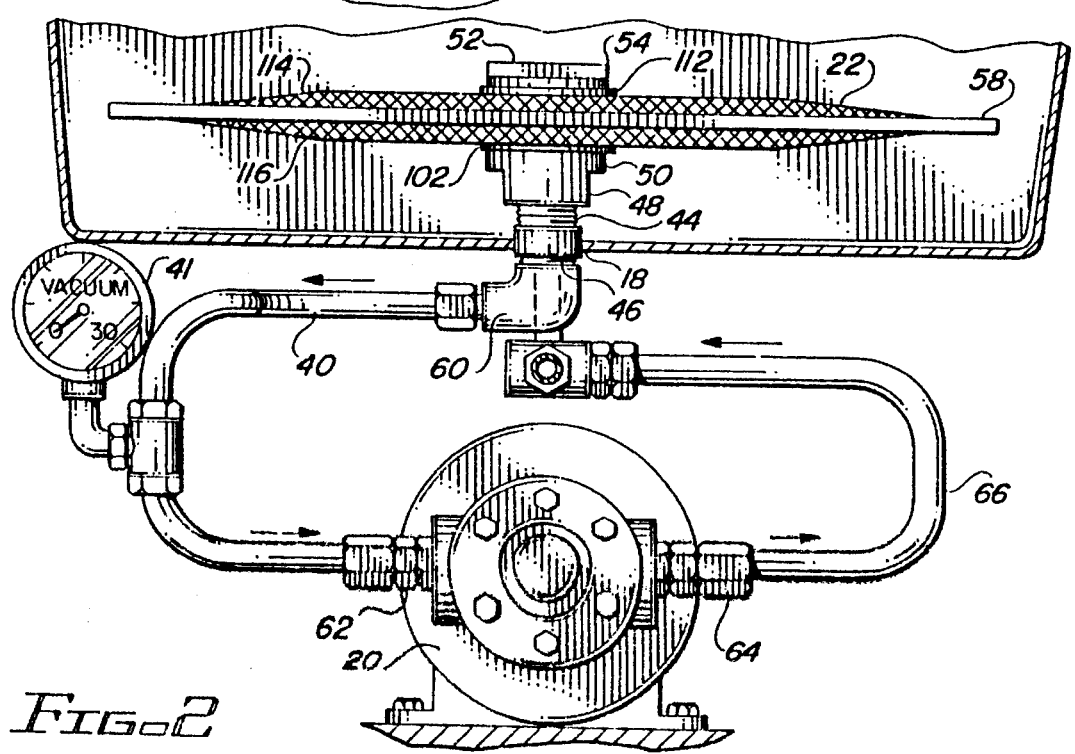
FIG. 2 is a partial cross-sectional view taken across lines 2—2 of FIG. 1 of the cooking oil filtering apparatus of the present invention.

FIG. 2 shows a more detailed view of the configuration of the filter plate 22 as attached to the outlet port 18. Specifically, the outlet port 18 is a threaded member which is affixed to the bottom surface 24 of tank 12. The outlet port 18 extends through the bottom surface 24 of tank 12 and is welded, about its periphery, to the tank 12. The outlet port 18 includes an interior passageway which allows for the movement of cooking oil therethrough. The outlet port 18 includes a first threaded portion 44 extending above the bottom surface 24 within tank 12. The threaded outlet port 18 also includes another threaded portion 46 extending below the bottom surface 24. The first threaded portion 44 is threadedly fastened to a lower cap 48. Lower cap 48 is a female threaded member which is attached to the first threaded portion 44 of outlet port 18. The cap 48 extends upwardly and includes a generally flat top lip 50. Top lip 50 supports the filter plate 22 in a generally parallel relationship to the bottom surface 24 of tank 12. Washer member 102 is juxtaposed against the top surface of top lip 50 and against the lower surface of filter plate 22.

An upper cap 52 is provided which includes a bolt head 54. Upper cap 52 is threadedly connected internally of the lower cap 8. The filter plate 22 is sandwiched between the upper cap 52 and the lower cap 48. As will be described hereinafter, a plurality of radial ports extend through the interior of the body of the upper cap 52 so as to allow for suction forces to enter the interior of the filter plate 22.

The upper cap 52 is easily threadedly fastened to the lower cap 48 so as to allow for simple removal of the filter plate 22, as needed. A washer member 112 is juxtaposed against the bottom surface of head 54 of top cap 52. Washer 112 serves to properly sandwich the filter plate 22 between the upper cap 52 and the lower cap 48.

It can be seen that the filter plate 22 is a generally flat member which extends adjacent to the bottom surface 24 within tank 12. The filter plate 22 is maintained between side wall 32 and side wall 28. In use, the cooking oil will flow around all of the sides of the filter plate 22. Filter plate 22 includes a first mesh screen 114 and a second mesh screen 116. A filter insert 120 (depicted in FIGS. 6 and 7) is placed between the mesh screens 114 and 116 for the purpose of supporting the relatively flexible mesh of screens 114 and 116. A peripheral channel member 58 extends around the outer edges of the filter plate 22 so as to cause the outer edges of the mesh screens 114 and 116 to be in juxtaposition, along with the filter insert 120.

The outlet port 18 has a second threaded portion 46 which is threadedly connected to elbow 60 below the bottom surface 24 of tank 12. Elbow 60 connects to line 40. Line 40 extends below the bottom surface 24 to the inlet port 62 of pump 20. When the pump 20 is activated, a suction force is created through line 40 and into the filter plate 22. In effect, this causes cooking oil contained within the interior of tank 12 to flow toward the suction on the filter plate 22. The mesh screens 114 and 116 will cause the particulate matter within the cooking oil to accumulate on the surfaces. The filtered cooking oil is then free to flow through elbow 60, through line 40 to the pump 20.

The pump 20 includes an outlet port 64 connected to line 66. The pump 20 causes the filtered cooking oil to pass through the outlet port 64 and into line 66 in a continuous fashion. Line 66 will pass the cooking oil toward the lines 36 and 38, as connected to inlet ports 14 and 16 on the side walls of tank 12. The arrows of FIG. 2 show the flow of cooking oil during the operation of the present invention. It can be seen that the pump 20 is solidly bolted to a surface 68 below the tank 12.

Vacuum gauge 41 is connected to line 40 to monitor the pressure of the liquid contained therein.

FIG. 3 shows the configuration of the pump 20 in relation to the outlet port 18 and the inlet ports 14 and 16. FIG. 3 shows that the tank 12 has a desired level of cooking oil 70 contained therein. The cooking oil 70 is supported above the tank bottom 24 and within the walls 28 and 32.

In FIG. 3, the inlet port 14 is shown affixed to side wall 32. The inlet port 14 is positioned below the level of the cooking oil 70. Inlet port 14 comprises a pipe cap 72 which is affixed to a threaded member 74 extending through the wall 32. The pipe cap 72 has a solid end and includes a slot 78 extending along a portion of its lower surface. Internally, the pipe cap 72 has an interior passageway which communicates with the interior of line 36. The slot 78 extends around the lower surface of end cap 72 approximately one hundred and eighty degrees. The slot 78 communicates with the interior passageway on the cap 72 such that any cooking oil passing through the line 36 is discharged through the slot 78. As can be seen from the direction of arrow 80, the cooking oil is directed toward the bottom 24 of tank 12. It is important that the inlet ports 14 and 16 be submerged so as to prevent aeration of the cooking oil. Additionally, to avoid any splattering and to enhance flow of cooking oil toward the lower portion of tank 12, the cooking oil is directed downwardly within the interior of tank 12. The direction of flow from inlet port 14 enhances the ability of the cooking oil to be distributed throughout the interior of tank 12.

The inlet port 16 has a similar configuration as that of the inlet port 14. It can be seen that the inlet port 16 extends through wall 28 of tank 12. A line 38 is connected to the inlet port 16 so as to allow cooking oil to be passed to the inlet port. A slot 82 is provided on inlet port 16 so as to allow the cooking oil to be delivered downwardly into the tank 12, in the manner described with inlet port 14.

Lines 36 and 38 are connected to a T-branch 84. T-branch 84 is, in turn, connected to conduit 66 which extends to pump 20. Pump 20 causes the cooking oil to pass to the T-branch 84 and outwardly therefrom to the lines 36 and 38 for ports 14 and 16, respectively. The use of the T-branch 84 allows for the even distribution of cooking oil between each of the lines 36 and 38.

The outlet 18 is positioned in the bottom 24 of tank 12. Outlet 18 is connected by line 40 to the pump 12. As cooking oil is drawn into outlet 18, the suction of pump 20 draws the cooking oil through line 40. The pump causes the cooking oil to pass from line 40 into the conduit 66 for delivery to the tank 12. A controller 88 is electrically connected by line 90 to the pump 20. Controller 88 includes a suitable power source for the operation of the pump 20. Typically, the pump 20 will be driven by one hundred and twenty volts AC. However, within the scope of the present invention, it may be possible to drive pump 20 by battery power, or by other means. The controller 88 is suitable for controlling the flow rate of cooking oil through the pump 20 and for controlling the temperature of the cooking oil. A more detailed view of the controller 88 is shown in FIG. 5.

FIG. 4 is an illustration of the hydraulics of the pumping system of the present invention. Specifically, pump 20 is connected to the inlet ports 14 and 16 and to the outlet port 18. The outlet port 18 is affixed to the filter plate 22. The pump 20 is initially connected by line 40 to the elbow 60 affixed to the outlet 18 on the bottom surface 24 of the tank. The filter plate 22 is removably affixed to the outlet port 18. The filter plate 22 is shown as extending adjacent to and in parallel relationship to the bottom surface 24. The line 40 is connected to the inlet 62 of pump 20. The outlet 64 of pump 20 delivers cooking oil into conduit 66. Conduit 66 is connected to the T-branch 84. T-branch 84 has one end connected to line 36 and another branch connected to line 38. T-branch 84 serves to evenly distribute the flow of cooking oil between the line 36 and the line 38. Line 36 extends to port 14. Line 38 is connected to the port 16. Cooking oil can then be passed into the interior of the tank in a continual manner.

It is a feature of the preferred embodiment of this invention that the pump 20 exerts a vacuum through outlet port 18 thereby drawing cooking oil through filter plate 22. Slots 78 and 82 are so sized in relation to lines 36 and 38 as to provide restriction in fluid flow thereby providing a downwardly-directed flow at an outlet pressure only greater than the pressure of lines 36 and 38. Slots 78 and 82 thereby direct cooking oil flow outwardly and downwardly.

FIG. 5 shows the arrangement of the controller 88. Essentially, controller 88 includes a temperature control 92, an on-off switch 94, and a flow rate switch 96. Various other controls and monitors can be envisioned within the scope of the present invention. The use of the on/off switch 94 allows the pump 20 to be activated, as needed. For example, when it is necessary to change out the filter plate 22, the switch 94 can be placed into its "off" position.

A two-speed pump motor is provided in the preferred embodiment, with switch 96 provided to adjust the motor speed between a "high" and "low" level. In the preferred embodiment, the high setting provides a flow rate of approximately 5 gallons per minute and the low setting provides a flow rate of approximately 3 gallons per minute. The high setting is used when the filtering apparatus 10 is initially activated. The filtering apparatus 10 is operated at the high speed until a filter cake 118 (depicted in FIG. 6) is formed along the outer surfaces of mesh screens 114 and 116, at which time the switch 96 may be turned to the low setting allowing continuing operations at the lower flow rate.

Additionally, the high setting may be used when a greater accumulation of filter cake 118 is accumulated on the mesh screens 114 and 116 to compensate for otherwise reduced flow.

The temperature of the cooking oil can be suitably controlled by adjusting the temperature knob 92. The temperature control knob 92 activates and de-activates the heating elements 33 located in the interior of tank 12.

Figure 6:
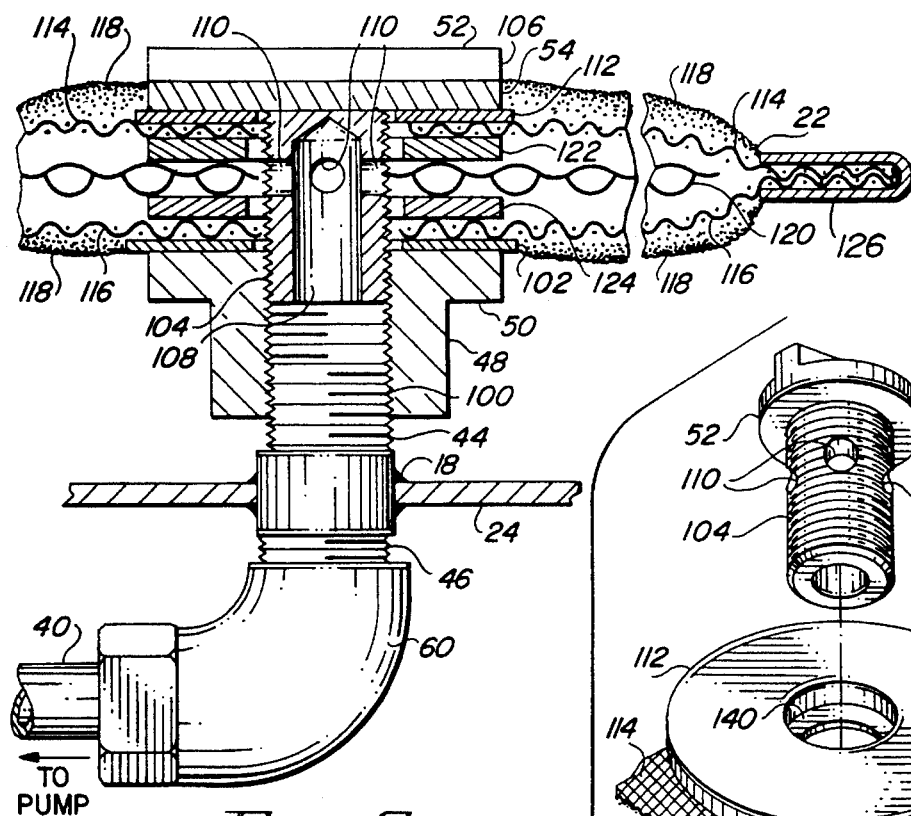
FIG. 6 is a detailed cross-sectional view of the filter plate assembly of the present invention.

FIG. 6 shows the configuration of the filter plate 22 in combination with the outlet port 18. As described previously, the outlet port 18 has a first threaded portion 44 and a second threaded portion 46. The second threaded portion 46 is threadedly connected to elbow 60. Elbow 60 is threadedly connected to line 40 which extends to the pump. The outlet port 18 extends through the bottom surface 24 of the tank. The outer periphery of outlet port 18 has its periphery welded to both sides of bottom surface 24 so that the outlet port 18 is in liquid-tight relationship with the bottom surface 24. The first threaded portion 44 extends upwardly transverse to the bottom surface 24. The first threaded portion 44 is a male threaded member. The first threaded portion 44 is threadedly connected to the lower cap 48 of the filter plate 22.

The lower cap 48 has internal threads 100 suitable for mating engagement with the first threaded portion 44 of outlet port 18. The lower cap 48 includes an upper lip 50 which has a greater diameter than the body of lower cap 48. The internal threads 100 of the lower cap 48 extend through the interior passageway of the lower cap 48. The lower cap 48 is simply rotated onto the first threaded portion 44 of outlet port 18 for attachment. A washer 102 is juxtaposed against the top surface of the upper lip 50 of lower cap 48. Washer 102 has a generally flat surface and an annular interior area. The combination of the upper lip 50 and the washer 102 serves to support the filter plate 22 in a position generally parallel to the bottom surface 24 and in a position transverse to the interior passageway of the outlet port 18.

In FIG. 6, it can be seen that the upper cap 52 is threadedly received by the lower cap 48. The upper cap 52 has a head portion 54 and a threaded body portion 104. The head of the upper cap 52 has a knurled outer surface. An outwardly projecting surface 106 extends above the top surface of the head 54 so as to assist in the accessing and rotating of the upper cap 52 with respect to the lower cap 48. The threaded body portion 104 has an interior passageway 108 drilled and tapped therein. The interior passageway 108 is in fluid communication with the interior passageway of the outlet port 18. The body portion 104 is in generally fluid-tight relationship with the lower cap 48 and the outlet port 18. The interior threads of the lower cap 48 engage the male external threads on the body portion 104 of cap 52. A plurality of ports 110 extend radially through the body portion 104. The ports 110 are in fluid communication with the interior passageway 108 such that any suction applied to the interior passageway 108 will cause cooking oil to pass through the radial ports 110, through the interior passageway 108 and through the outlet port 18.

The head 54 of cap 52 is juxtaposed against an upper washer 112. The lower edges of the head 54 are juxtaposed against the upper surface of the washer 112. In this configuration, the combination of the upper cap 52 (and the washer 112) serves to sandwich the filter plate 22 with the lower cap member 50 and the associated washer 102.

In addition to the upper cap 52 and the lower cap 48, the filter plate 22 includes a first mesh screen 114 and a second mesh screen 116. The first mesh screen 114 is juxtaposed against the washer 112 adjacent to the upper cap 52. The first mesh screen 114 includes a central opening which allows the body portion 104 of upper cap 52 to pass therethrough. The second mesh screen 116 is juxtaposed against the washer 102 associated with the lower cap member 48. The lower cap member 48 serves to position the second mesh screen 116 in a position generally parallel to the bottom surface 24 of the tank. The first and second mesh screens are formed of a flexibly rigid and durable wire mesh.

Wire mesh of the following warp and fill (express in strands per inch) and with the indicated respective diameters have been determined to be suitable: 24×110 wire mesh with 0.0145 inch and 0.0090 inch strand diameters respectively; 80×70 wire mesh with strand diameter of 0.0055 inches; and 100 wire mesh with strand diameter of 0.0045 inches. It should be understood that other combinations of warp and fill and strand sizing or material of construction may be practiced without departing from the scope of the invention. The distance between the parallel strands is generally between two and five microns. The configuration of the mesh screens of the present invention is suitable for removing those very tiny food particles which are found in the cooking oil. The very fine mesh material which is used in the present invention is suitable for removing both particles and fat globules which may be found in the cooking oil. In use, these particles and fat globules will accumulate on the outer surfaces of the mesh screens 114 and 116. It has been found that, over time, the accumulation of particles forms a filter cake 118 which serves to filter the cooking oil. Very small flow paths will form through the filter cake 118 as it accumulates on the exterior surfaces of the screens 114 and 116. As such, the present invention can operate effectively as a cooking oil filter simply by the use of the fine mesh screens of the filter plate 22.

Within the scope of the present invention, a filter powder may be added to the cooking oil. The filter powder may be comprised of a diatomaceous earth, pearlite, a chemical mixture or a combination of these. As the filter powder is added to the cooking oil, the filtering apparatus of the present invention will have a tendency to draw the filter powder such that it rests in surface-to-surface contact with the outer surfaces of the wire mesh screens 114 and 116. The flow path of the cooking oil in conjunction with the composition of the filter powder causes the filter powder to aggregate at the outer surfaces of the screens 114 and 116, forming filter cake 118. It is noted that within the scope of the present invention filter cake 118 may be comprised of a combination of filter powder and comestible particulate matter or alternatively, simply comestible particulate matter. The filter powder serves to enhance the filtering operation without adversely affecting the taste or quality of the food product. The suction applied by the pump to the filter plate 22 maintains fluidic channels within said filter cake 118 allowing for the continued filtering of the cooking oil.

A filter insert member 120 is interposed between the first mesh screen 114 and the second mesh screen 116. This filter insert member 120 is formed of relatively rigid metallic material, such as aluminum, and contains sufficient voids to allow the free flow of fluids therethrough, both vertically and laterally. The filter insert 120 is sufficient to support the relatively flexible mesh of mesh screen 114 and mesh screen 116. Aluminum plate having a tubular slit grid has been proven to be a material which is suitably plastic and suitably rigid at temperatures incurred in cooking oil applications. The tubular slit grid is formed generally by providing parallel slits in aluminum plate and deforming the area between the slits to provide alternately raised and lowered sections of material. The tubular slit grid provides passageways for a vertical and lateral fluid travel. Stainless steel is also a suitable material for the filter insert. The relatively rigid, yet porous, configuration of the filter insert 120 provides support to the mesh screen 114 and to the mesh screen 116 while providing fluidic communication with the radial ports 110 associated with the outlet port 18. Washer 122 is interposed between the top surface of the filter insert 120 and the bottom surface of the first mesh screen 114. Similarly, washer 124 is interposed between the bottom surface of the filter insert 120 and the top surface of the second mesh screen 116. These washers 122 and 124 provide suitable separation between the filter insert 120 and the mesh screens 114 and 116. The filter insert 120, and each of the washers 122 and 124 have interior annular openings so as to accommodate the body portion 104 of the upper cap 52. As the upper cap 52 is tightened within the threads of the lower cap 48, the elements of the filter plate 22 are drawn together in a sandwiched configuration. The mesh screens 114 and 116 are joined at their outer periphery by a U-shaped channel member 126. This U-shaped channel member 126 extends around the periphery of the mesh screens 114 and 116 so as to maintain the outer edges of the screens 114 and 116 in a contiguous configuration. This also serves to contain the filter insert 120 therewithin.

In operation, upon activation of the pump, the cooking oil is drawn by suction applied by the pump through the mesh screens 114 and 116, through the relatively porous filter insert 120 and the lateral passages therein, through the ports 110, into the interior passageway of the outlet port 18, and through the elbow 60 and line 40 to the pump.

The vacuum gauge 41 monitors the vacuum of line 40 between the filter assembly 22 and pump 20. Increased vacuum at vacuum gauge 41 indicates a build-up of filter cake 118 on filter assembly 22.

Location of the filter assembly below heating element 33 is advantageous in that the particulate matter accumulated in the filter cake 118 is retained in the area of the cooking oil 70 below the said heating elements 33. The area of the cooking oil 70 below the heating elements 33 is cooler that the area above the heating elements 33 during operation. As a result, particulate matter is maintained in a cooler area. As a result, particulate matter is less likely to char, and there is less free fatty acid in the cooking oil. The downward flow of cooking oil from inlet ports 14 and 16 further directs particulate matter to the lower, cooler zone resulting in extended life of the cooking oil. The downward flow of cooking oil from parts 14 and 16 and the accumulation of particulate matter in filter cake 118 each serve to prevent particulate matter from attaching to food being cooked, thereby improving the taste of products cooked in the cooking oil.

Figure 7:
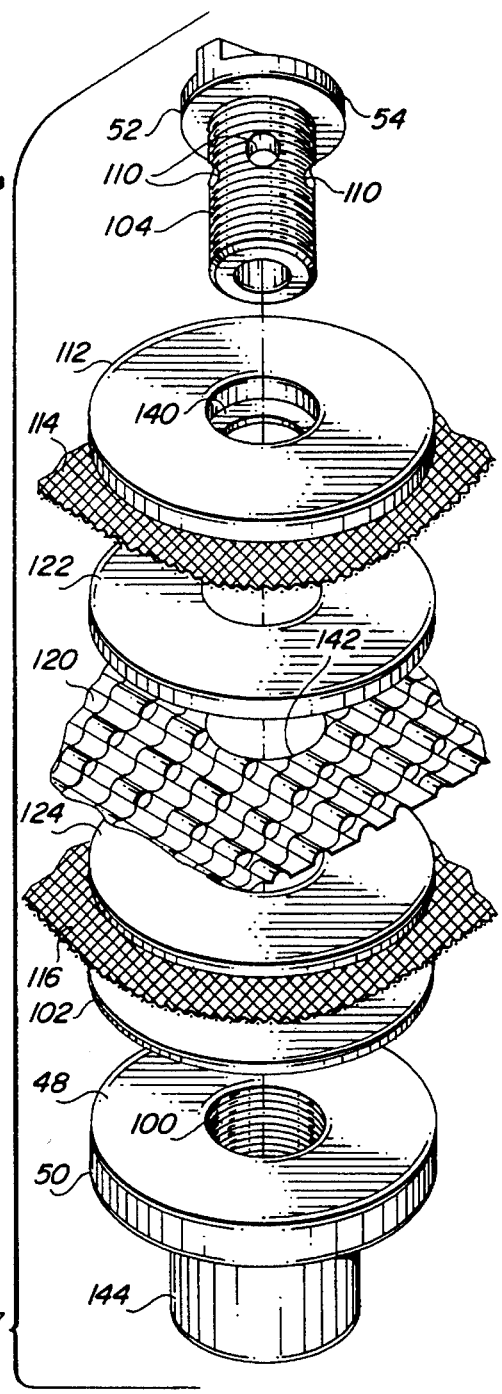
FIG. 7 is an exploded view of the filter plate assembly of the present invention.

FIG. 7 shows an exploded view of the filter plate 22 in accordance with the present invention. From top to bottom, it can be seen that the upper cap 52 has a threaded body portion 104 with a plurality of ports 110 formed therein. The head 54 of upper cap 52 includes an outwardly extending projection 106. The interior passageway 108 is drilled and tapped through the body portion 104 so as to be in fluid communication with the radial ports 110. Washer 112 has a generally circular configuration and an annular interior opening 140. The annular interior opening 140 has a diameter suitable for extending around the periphery of the body portion 104 of upper cap member 52 but less than the diameter of the head 54. The upper wire mesh screen 114 is positioned below the washer 112. Washer 122 is positioned below the mesh screen 114 so as to properly sandwich the mesh screen 114 in conjunction with the washer 112. The tubular slit material of filter insert 120 is placed against the lower surface of the washer 122. It can be seen that the tubular slit material 120 has a plurality of vertical and lateral passages extending therethrough. A central aperture 142 is formed therein so as to fit against the outer diameter of the body portion 104 of upper cap 52. In general, the tubular slit material of the filter insert 120 will have a generally corrugated appearance for the purpose of providing the necessary passageways and for providing sufficient strength and rigidity to the filter plate 22. Washer 124 is placed against the underside of the filter insert 120. The second wire mesh screen 116 is juxtaposed against the bottom surface of washer 124 adjacent to the bottom surface of filter insert 120. Another washer 102 is then juxtaposed against the bottom surface of the wire mesh screen 116.

Washer 112 and 122 may be fixedly attached to mesh screen 114, such as by spot welding. Likewise, washers 124 and 102 may be fixedly attached to mesh screen 116.

In FIG. 7, it can be seen that the lower cap 48 includes a threaded interior 100. Threaded interior 100 is suitable for receiving the male thread of the body portion 104 of upper cap 52. As the upper cap 52 is tightened within the female threads and lower cap 48, the aforestated elements of the filter plate are suitably sandwiched therebetween. The upper lip 52 of the lower cap 48 provides additional structural support for this sandwiched arrangement. The bottom edge 144 of the lower cap 48 is affixed to the upper threaded portion 44 of the outlet port 18.

Figure 8:
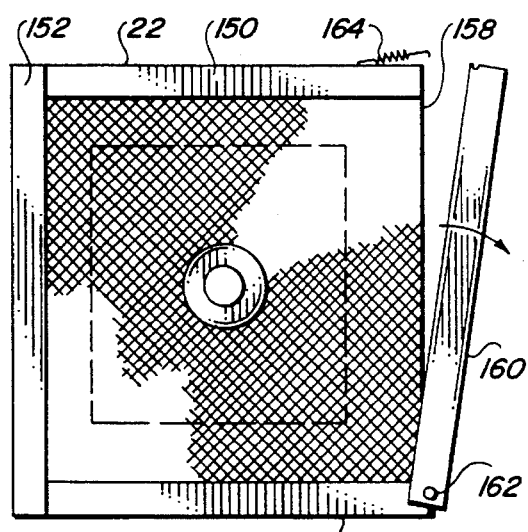
FIG. 8 is a top plan view of the filter plate assembly of the present invention.

FIG. 8 shows a top view of the filter plate 22 as used in conjunction with the present invention. It can be seen that, in general, the filter plate 22 is a filter assembly of square or rectangular configuration. U-shaped channel members 150, 152, and 154 are located along three outer edges of the filter assembly 22. Channel members 150, 152, and 154 maintain the three edges of the filter elements in a contiguous configuration along the length of each respective edge. The three edges are joined contiguously by the channel members 150, 152, and 154 in conjunction with the mesh screens 114 and 116 forming a pocket into which the filter insert 120 is inserted. Channel members 150, 152, and 154 may be permanently attached to the mesh screens 114 and 116 and may be permanently attached at their point of intersection. A suitable means for attachment of these elements includes spot welding.

Another U-shaped channel member 160 is pivotally connected at 162 to the end of channel member 154. After insertion of the filter insert 120 into the envelope pocket, the non-attached end of channel member 160 is rotated toward the unconnected edge 158 until the non-attached end connects to the end of channel member 150. The channel member 160 is releasably secured by spring 164. The outer edges of the first mesh screen 114 and the second mesh screen 116 are maintained within the channel of the channel member 160. Upon connection of the channel member 160 to channel member 150, the mesh screens 114 and 116 are connected at their outer edges around the entire periphery. The peripheral edges of the mesh screens may be plasma-welded prior to connection of the channel member so as to prevent tearing or unraveling of the exposed ends.

The present invention prevents aeration of the cooking oil by positioning the inlet ports 14 and 16 below the desired level 70 of the cooking oil within the tank 12. Additionally, the returned cooking oil is directed toward the bottom of the tank 12, thereby inducing flow of cooking oil and entrained particulate matter to the lower, cooler area of the cooking oil contained in tank 12. The positioning of the filter assembly 22 and the outlet port 18 near the bottom of the tank 12 allows the upper surface of the tank 12 to be free of conduits, piping, and other obstructive elements. The use of the threaded portions on the outlet port 18 allows for the easy installation of the filter assembly 22 without undue manipulation and effort.

Experimental use of the continuous-filtering fryer apparatus of the present invention indicates that continuous filtering of cooking oil during cooking operations with the subject filtering apparatus provides for extended useful life of cooking oil.

The continuous-filtering fryer apparatus of the present invention may be used to cook a wide variety of comestibles.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A method of continuously filtering cooking oil while frying a food wherein the cooking oil is contained within a tank comprising the steps of:

positioning a filter plate within said tank in a region below a heating source, said filter plate comprising at least one mesh screen operatively connected to piping means, supported on an upper position of said piping means extending through a bottom of said tank;

filtering said cooking oil through said filter plate;

heating said cooking oil to a desired temperature using said heating source;

pumping said cooking oil through said at least one mesh screen, through piping operatively connected to said piping means located exterior of said tank, and returning said cooking oil into said tank at a level below the surface of said cooking oil and above said heating source;

directing a flow of said returning cooking oil downward toward said bottom of said tank;

said pumping step continually performed during a first period to circulate said cooking oil until an aggregation of particulate matter accumulates on an outer surface of said at least one mesh screen, and continually pumping said cooking oil thereafter during a second period while frying the food product.

2. The method of claim 1 including: disposing a powder within said tank to enhance the aggregation of particulate matter at the outer surface of said mesh screen.

3. The method according to claim 1 including: pumping at a relatively higher flow rate during said first period to enhance aggregation of particulate matter at the outer surface of said mesh screen.

4. The method of claim 1 including: ceasing said pumping during a third period, removing the said filter plate from the said tank, and cleaning accumulated particulate matter from the said mesh screen, and thereafter restarting pumping during said first period and said second period.

5. A method of continuously filtering cooking oil while frying food comprising the steps of:

providing a tank having a cooking oil therein;

providing a first inlet port extending through a side wall of the tank;

providing a second inlet port extending through an opposite side wall of the tank, said first and second inlet ports connected to a pump means by a conduit;

providing a first line extending from said first inlet port;

providing a second line extending from said second inlet port, said first and second lines connected to a T-branch, said T-branch connected to said pump means, said T-branch for passing cooking oil relatively evenly between said first inlet port and second inlet port;

filtering said cooking oil through a filter plate located within said tank positioned in a region of said cooking oil above said tank bottom and below said heating source, said filter plate comprising at least one mesh screen operatively connected to piping means;

heating said cooking oil to a desired temperature using a heating source;

pumping the said cooking oil through said mesh screen, through said first and second inlet ports, and returning the cooking oil into the said tank at a level below the surface of the cooking oil and above said heating source;

directing the flow of said returning cooking oil downward toward a bottom of said tank;

heating said cooking oil at a position below the return level of said cooking oil;

said pumping being continually performed during a first period to circulate said cooking oil until an aggregation of particulate mater accumulates on the outer surface of said mesh screen, and continually pumping said cooking oil thereafter during a second period while frying the food product.

* * * * *